Patented June 22, 1948

2,443,893

UNITED STATES PATENT OFFICE 2,443,893

PROCESS FOR MAKING STABLE EMULSIONS OF RESINOUS MATERIALS

Henry Michael Collins, Stamford, Conn., assignor to Shawinigan Chemicals Limited, Montreal, Quebec, Canada, a corporation of Canada No Drawing. Application May 16, 1945, Serial No. 594,163. In Canada June 8, 1944

6 Claims. (Cl. 260—29.6)

INTRODUCTION

This invention relates to compositions of matter in the form of aqueous emulsions embodying resinous materials. More specifically, the invention relates to the formation of aqueous emulsions from a class of resinous materials which cannot be formed from a monomer by simple polymerization in aqueous medium.

In the use of such resinous materials, for instance in coating fabrics or metals, the usual method has been to apply the material from solution in an organic solvent. This method has the disadvantage that large amounts of solvent are lost, expensive and unwieldly solvent recovery apparatus is required and that it involves the hazard of working in the presence of large amounts of solvent.

Attempts have been made to compromise by forming emulsions by first dissolving the resinous material in a solvent and then emulsifying the solution in water. This only partly solves the problem since large amounts of solvent are still lost in application and health and fire hazard is not entirely eliminated.

There have also been attempts to reduce the use of solvents in the manufacture of certain of the bodies to which the invention applies, by forming emulsions from monomers by complex processes involving not only simple polymerization, but also other steps. These processes, have, however, only passed through the aqueous dispersion stage in the course of arriving at a solid end product. The processes involved are such that the final products contain salts or other impurities in addition to emulsifying agents.

With the object of overcoming the disadvantages of employing resinous solutions, the applicant has been able to prepare stable aqueous emulsions of resinous materials of the type mentioned. These aqueous emulsions are substantially free from undesirable impurities. They contain very small amounts of solvent. The bulk of the solvent used in the preparation of the emulsion is easily recovered during the process and by working in a closed system no fire or health hazard exists. The emulsions can be used to replace solutions of the resinous materials in applications such as laminations of various kinds, metal and fabric coating and wherever it is permissible or possible to employ heat, preferably accompanied by pressure.

The applicant's new compositions are made by dissolving the resin in a water-immiscible solvent, dispersing the solution in water containing specific members of a group of organic lyophilic colloidal high viscosity emulsifying agents, and removing the solvent by distillation and recovering it, while maintaining the stability of the emulsion. The emulsifying agents employed are one or more polyvinyl compounds, and one or more natural lyophilic colloids selected from the group consisting of gums and algae, and if desired a cellulose derivative. In conjunction with these colloids is also used a surface active agent, preferably anionic.

As will be evident from the examples and the following discussion, these agents are effective in suitable amounts to protect the emulsion in the presence of the solvent and at the temperatures encountered during the recovery of the solvent. They are also effective in protecting the resulting emulsion during storage at temperatures down to about 0° C.

The nature of the process and consequently of the resulting compositions permits of variation in several respects, among which are the nature of the resinous body, the proportion of solids, the nature of the emulsifying agents, the viscosity of the emulsion, and the particle size of the dispersed phase. The compositions can be modified by compounding, as for instance, with solvents, fillers, pigments, plasticizers and waxes. The emulsions made by the process herein described are compatible with one another. This property permits the preparation of mixtures of emulsions of various resins.

EXAMPLES

In order to explain the invention further, before dealing with specific variables encountered, examples will now be given of several actual procedures developed by the applicant. It will be understood, however, that these are not to be taken in a limiting sense, but merely as illustrating the methods described elsewhere in principle.

APPARATUS

The apparatus employed for the preparation of the emulsions described in the following examples consisted of a pot equipped with a stirrer and a condenser serving to condense the vapours of solvent and water.

The pot was of stainless steel and was about 8 inches high and 5 inches internal diameter fitted with a discharge pipe ¾ inch in diameter. The pot was jacketed for convenience of heating.

The stirrer was also of stainless steel and had a shaft 16½ inches long bearing a cluster of 4 blades one inch by ½ inch set half an inch from the bottom of the shaft. The blades were bent at an angle of 45° for upward thrust. A second set of 2 blades 2½ inches by ¾ inch twisted at 45° for downward thrust were affixed 2 inches from the bottom of the shaft. The speed of the stirrer was adjustable and could be varied from about 600 to about 1800 R. P. M. The condenser was connected to the cover of the pot.

EXAMPLE 1

Polyvinyl formal emulsion 4312 parts by weight of a 16.7% solution in ethylene dichloride of polyvinyl formal made by acetalization to an extent of 90% of a polyvinyl acetate, whose one molar solution in benzene had a viscosity of 15 centipoises at 20° C. was made up. This solution had a viscosity of 800 poises at 20° C. The solution was added in the manner described below to the following charge which was contained in the pot.

The concentration of the various constituents were substantially as follows:

| | |
|---|---|
| Water_____parts__ | 1000 |
| A partially hydrolyzed polyvinyl acetate of viscosity 7 centipoises containing 20% residual acetate groups_____per cent__ | 1 3 |
| Water-soluble partially hydrolyzed cellulose methyl ether of viscosity 4000 centipoises_____per cent__ | 1. 25 |
| Gum tragacanth_____do____ | 1. 5 |
| Sodium salt of the sulphonic acid of dioctyl succinate___do____ | 1. 4 |

¹ By weight on the water.

About 25% of the polyvinyl formal solution was allowed to run into the above charge. The stirrer was started and its speed maintained at about 1200 R. P. M. throughout the run. The temperature of the jacket was then raised until distillation started. The rate of distillation was maintained by the appropriate adjustment of the rate of addition of the solution and of the heat supplied to the jacket so that excessive foaming did not occur. The volumes of solution added and distillate removed per unit of time were maintained more or less equal until all the solution had been added. Then, the excess solvent was distilled off and the temperature allowed to rise to about 90° C. The charge was then cooled to about 60° C. and the finished emulsion dumped hot.

Particulars of the procedure and of the resulting composition of matter were substantially as follows:

| | |
|---|---|
| Emulsion viscosity at 20° C_____ | 2000 centipoises. |
| Total solids_____ | 42%. |
| Stability_____ | over 2 years. |
| Particle size_____ | .5µ to 30µ (90% between .5µ and 10µ). |
| Time of run_____ | 3½ hours. |
| Lag time (distillation time after total solution added). | 40 minutes. |
| Temperature range_____ | 20° C. to 90° C. |
| Solvent recovery_____ | 93%. |
| Residual solvent_____ | 3%. |

This material was useful for coating and similar purposes.

Discussion

The maintenance, during the major portion of the run, of a constant solvent level to about 25% of the total charge demands a rapid distillation rate. At the same time, due to the high protective action of the emulsifying materials fine particle size and emulsion stability are maintained.

The rate of addition of the polyvinyl formal solution is somewhat critical in that an excess of solvent in the charge will result in the formation of large coarse particles and possibly instability, whereas too slow an addition of solution results in an unnecessary extension of the distillation time. The use of more dilute resin solutions also tends to increase the emulsion viscosity.

Polyvinyl formal emulsions made according to these teachings after the addition of small amounts of solvent are useful for coating wood veneers which may be laminated under the influences of heat and pressure to form rigid boards from which aircraft propellers may be fashioned. Impregnation of open-grained materials such as leather and cloth can be readily effected, but the high softening polyvinyl formal demands that heat, preferably accompanied by pressure, is used in order to obtain a continuous water-resistant film.

EXAMPLE 2

Polyvinyl formal solution 8.2 parts of an emulsifier solution as used in Example 1 and 0.5 part of ethylene dichloride were charged to the kettle. The mixture was heated while stirring until the distillation of the azeotrope (ethylene dichloride and water) started. Then the addition of 50 parts of an 8.2% ethylene dichloride solution of polyvinyl formal of the same grade as used in Example 1 was started. The temperature of the kettle was maintained during this addition between about 74° C. and about 78° C. so that the rate of removal of the solvent permitted the polyvinyl formal solution to be added in a period of about 3 hours, without the volume of the kettle charge increasing unduly. When this addition was completed, the temperature of the charge was slowly raised to about 90° C. and held there till distillation was substantially complete. The charge was then cooled to about 60° C. and dumped.

| | |
|---|---|
| Viscosity of the solution used_____ | 12 poises at 20° C. |
| Viscosity of emulsion obtained_____ | 8 poises at 20° C. |
| Total solids in emulsion_____ | 40%. |
| Stability_____ | over 2 months. |
| Particle size_____ | 0.5µ to 15µ (90% between 1µ and 6µ). |
| Time of run_____ | 4 hours. |
| Lag time (distillation time after all solution added). | 40 minutes. |
| Solvent recovery_____ | 97%. |
| Residual solvent in the emulsion_____ | 3½%. |

Corresponding amounts of solutions containing up to about 18% polyvinyl formal may be used as in the above examples. The more dilute solutions are preferred for ease of handling, and because the resulting emulsions have slightly finer particles.

EXAMPLE 3

Phenol formaldehyde resin emulsion

With the exception that a 50% solution of a benzene-soluble phenol formaldehyde resin replaced the polyvinyl formal solution, the procedure of Example 1 was repeated.

Particulars of the procedure and of the resulting composition of matter were substantially as follows:

| | |
|---|---|
| Emulsion viscosity_____ | 1500 centipoises |
| Total solids_____ | 50%. |
| Stability_____ | over 2 years. |
| Particle size_____ | 2µ to 15µ (90% between about 2µ and 6µ). |
| Time of run_____ | 2 hours. |
| Lag time (distillation time after total solution added). | 20 minutes. |
| Temperature range_____ | 69° C. to 90° C. |
| Solvent recovery_____ | 93%. |
| Residual solvent_____ | 3%. |

This material was useful for coating and similar purposes.

EXAMPLE 4

Ethyl cellulose

With the exception that an 18% solution of ethyl cellulose in methylene chloride replaced the polyvinyl formal solution, the procedure of Example 1 was repeated.

Particulars of the procedure and of the resulting composition of matter were substantially as follows:

| | |
|---|---|
| Emulsion viscosity | 2900 centipoises. |
| Total solids | 50%. |
| Stability | over 2 years. |
| Particle size | 2μ to 30μ (majority of the particles between about 5μ to 12μ). |
| Time of run | 4½ hours. |
| Lag time (distillation time after total solution added) | 40 minutes. |
| Temperature range | 37° C. to 80° C. |
| Solvent recovery | 96%. |
| Residual solvent | 1%. |

This material was good for coating or similar purposes.

EXAMPLE 5

Polyvinyl butyral emulsion

With the exception that a 15% solution of polyvinyl butyral (12% residual hydroxyl groups, low viscosity) in benzene replaced the polyvinyl formal solution, the procedure of Example 1 was repeated.

Particulars of the procedure and of the resulting composition of matter were substantially as follows:

| | |
|---|---|
| Emulsion viscosity | 2900 centipoises. |
| Total solids | 40%. |
| Stability | over 2 years. |
| Particle size | .5μ to 30μ (majority of the particles between about .5μ and 10μ). |
| Time of run | 4 hours. |
| Lag time (distillation time after total solution added) | 40 minutes. |
| Temperature range | 69° 3. to 95° C. |
| Solvent recovery | 93%. |
| Residual solvent | 4%. |

This material was good for coating or similar purposes.

Discussion

A polyvinyl butyral emulsion containing a sufficient amount, usually between about 8% and about 20% of a plasticizer-activating agent is useful for the impregnation or coating of cellulosic material.

The resulting products have properties similar to those of rubber sheetings, rubber impregnated cloth, etc. A polyvinyl butyral emulsion can also be used to impregnate leather and other porous materials. Only mild heating, i. e. temperatures of between about 60% C. to about 100° C. is required to form continuous films.

EXAMPLE 6

Rosin emulsion

With the exception that a 50% solution of rosin in benzene replaced the polyvinyl formal solution, the procedure of Example 1 was repeated.

Particulars of the procedure and of the resulting composition of matter were substantially as follows:

| | |
|---|---|
| Emulsion viscosity | 1800 centipoises. |
| Total solids | 50%. |
| Stability | over 2 years. |
| Particle size | 1μ to 10μ (majority of the particles bteween about 1μ and 6μ). |
| Time of run | 2 hours. |
| Lag time (distillation time after total solution added) | 20 minutes. |
| Temperature range | 69° C. to 90° C. |
| Solvent recovery | 91%. |
| Residual solvent | 3%. |

This material was good for coating or similar purposes.

EXAMPLE 7

Gum dammar emulsion

With the exception that a 50% solution of gum dammar in benzene replaced the polyvinyl formal emulsion, the procedure of Example 1 was repeated.

Particulars of the procedure and of the resulting composition of matter were substantially as follows:

| | |
|---|---|
| Emulsion viscosity | 1800 centipoises. |
| Total solids | 50%. |
| Stability | over 2 years. |
| Particle size | 2μ to 15μ (majority of the particles between about 4μ and about 10μ). |
| Time of run | 2½ hours. |
| Lag time (distillation time after total solution added) | 20 minutes. |
| Temperature range | 69° C. to 90° C. |
| Solvent recovery | 94%. |
| Residual solvent | 3%. |

This material was good for coating or similar purposes.

RESINS

The resins to which the present invention is applicable may be described as natural resins and those synthetic resins which cannot be formed as aqueous emulsions directly from their monomers or which can be formed only with great difficulty by polymerizing in aqueous medium. Such resins must, of course, be water-stable and water-insoluble. Examples of the natural resins are rosin, gum copal and materials equivalent for the purposes of this invention. Examples of the synthetic resins are polyvinyl acetals, phenolics, polyamides, water-insoluble cellulose derivatives and materials equivalent for the purposes of this invention. Moreover, two or more of these materials may be compounded together in an emulsion.

EMULSIFYING MECHANISM

The emulsifying mechanism of the invention is of importance in maintaining stability under the stringent conditions occasioned by the presence of solvent and the high temperature of distillation. The agents employed belong to the class of neutral, organic hydrophilic non-ionizable colloids. The specific members of this class which are employable according to the present invention are one or more polyvinyl compounds, and one or more natural lyophilic colloids selected from the group consisting of gums and algae, and if desired a cellulose derivative. In conjunction with these colloids is also used a surface-active agent.

The preferred polyvinyl compounds are partially hydrolyzed polyvinyl acetates having an acetate group content of between about 10% and about 35% made from polyvinyl acetates of a viscosity in the range from about 7 upwards, with those in the range from about 7 to about 45 preferred. These agents are employed at a concentration from about .8% to about 5% with a concentration from about 2% to about 3% preferred. All these concentrations are based on the original water charge.

Other polyvinyl compounds may be substituted for the partially hydroyzed polyvinyl acetate, for instance, there may be employed other water-soluble or partially water-soluble partially hydrolyzed polyvinyl esters or water-soluble or partially water-soluble polyvinyl acetals or ethers.

The concentration of these vinyl compounds effective to replace the partially hydroyzed polyvinyl acetate is that range of concentrations giving in aqueous solution at 20° C., viscosities between about 2½ and about 6 centipoises.

The preferred natural lyophilic colloid is gum tragacanth, which is used at a concentration of between about .2% and about .8% on the original water charge. Other natural lyophilic colloids may be employed, as for instance, gum arabic, "Gomagel" (a commercial alga), agar-agar and gum carragheen. The concentrations will be commensurate with those employed for gum tragacanth but will vary with the emulsifying power of the particular body chosen. A guide to computing the equivalent concentration of these natural colloids is to determine the amount required to give a solution viscosity substantially equal to that of a solution of gum tragacanth at a concentration ranging from about 1.5% to about 3% in water, at about 20° C.

The preferred partially hydrolyzed cellulose derivative is methyl cellulose, viscosity 4000 centipoises, known in the trade as "Methocel 4000." This agent, when employed, is used at a concentration of between about .1% and about .4% by weight on the original water charge. Other cellulose derivatives may be employed such as for instance, glycol cellulose or water-soluble benzyl cellulose. The concentrations will be about the same as for methyl cellulose.

The following table is a further guide to the concentrations of emulsifying agents which may be used according to the invention. In the case of emulsions made from high viscosity resins and whose solutions have a relatively high viscosity with a relatively low solid content, for example, polyvinyl acetals and ethyl cellulose, the preferred range of partially hydrolyzed polyvinyl acetate is from about 2% to about 3%. For these upper and lower limits the preferred ranges of the other emulsifiers are shown in the table below:

3% partially hydrolyzed polyvinyl acetate with 0.2% gum tragacanth with 0.4% methyl cellulose 3% partially hydrolyzed polyvinyl acetate with 0.6% gum tragacanth with 0.1% methyl cellulose 3% partially hydrolyzed polyvinyl acetate with 0.8% gum tragacanth with no methyl cellulose 2% partially hydrolyzed polyvinyl acetate with 0.4% gum tragacanth with 0.4% methyl cellulose 2% partially hydrolyzed polyvinyl acetate with 0.6% gum tragacanth with 0.2% methyl cellulose 2% partially hydrolyzed polyvinyl acetate with 0.8% gum tragacanth with no methyl cellulose the above proportions are calculated on the original water charge.

In the case of emulsions made from low viscosity resins and whose solutions are of a relatively low viscosity with a high solid content, the following proportions are preferred.

2% partially hydrolyzed polyvinyl acetate with 0.5% gum tragacanth with no methyl cellulose 1% partially hydrolyzed polyvinyl acetate with 0.7% gum tragacanth with no methyl cellulose 0.8% partially hydrolyzed polyvinyl acetate with 0.8% gum tragacanth with 0.3% methyl cellulose 0.8% partially hydrolyzed polyvinyl acetate with 0.7% gum tragacanth with 0.3% methyl cellulose The above proportions are calculated on the original water charge.

The preferred surface-active agent is "Aerosol O. T." (the sodium salt of the sulphonic acid of dioctyl succinic ester) at concentrations between about .03% and about .6% by weight of the total charge. Other anionic surface-active agents may be employed, as for instance, the other "Aerosols" (homologues of "Aerosol O. T." being the diamyl, dibutyl, or the dihexyl esters; or isopropyl naphthalene sodium sulphonate—"Aerosol O. S."), "Aresklene" (dibutyl phenyl phenol sodium disulphonate), fatty acid soaps of hydroxyethyl ethylene diamine, the sodium salts of the sulphates of higher alcohols, "Merpentine" (sodium alkyl naphthalene sulphonate) and other anionic alkyl aryl type wetting agents. The concentrations of these agents should be about the same as for "Aerosol O. T." The criterion of utility is that the agent employed must be compatible and non-reactive with the other constituents of the charge.

PROCEDURE

The procedure described in the above examples is characteristic of the present invention. Water-immiscible and stable solvents for the bodies to be emulsified must be employed. Any suitable solvents may be used which are capable of being steam distilled from aqueous medium and which are solvents for the particular solid being emulsified. Examples of such solvents are methylene chloride, benzene, toluene, dichlorethylene, chloroform, xylene, ligroin, etc. Butanol is miscible with water to such an extent that it is uncertain in action and represents substantially the highest degree of water sensitivity that is permissible for the solvent.

The amount of solvent employed is that effective to dissolve the resin and to enable it to be freely flowable so that it can be finely distributed throughout the aqueous medium. The actual concentration depends on the solubility of the particular body being treated in the solvent chosen. Characteristic solution viscosities range between about .5 poise to about 100 poises. In certain cases, a mixture of solvents may be advantageous.

The nature of the emulsifying and distillation procedure is important. Certain precautions must be observed in order that the particle size of the dispersed phase is sufficiently low and that the stability of the emulsion be established and preserved throughout the distillation procedure and afterwards. The high protective action of the emulsifying agents and the action of the surface-active agent encourages fine particle size. The applicant has found that the maintenance of a substantially constant solvent concentration, below that which would cause coarse lumps or coagula to appear, permits the achievement of a rapid distillation rate. The actual concentration will, of course, depend to some extent on the softening point of the resin.

The conditions of treatment naturally affect the nature of the resulting product. For example, a low particles size is achieved by the use of a surface-active agent, efficient stirring and an adequate quantity of emulsifying constituents. Control over the emulsion viscosity may be achieved by adjusting the amount of the substituted cellulose emulsifying agent. The more of such a high viscosity agent, the higher the emulsion viscosity and vice versa. Particle size control depends on the efficiency of stirring, the homogeneity and purity of the emulsifying agents, the rate of distillation, the ratio of solvent to the charge and the viscosity of the resin solution and the presence of a surface-active agent. The range of particle size is preferably between about 5μ to about 10μ. Remaining small proportions of the particles may vary between the upper limit and about 30μ. In some cases a small quantity of particles as high as 50μ occurs, but for practical purposes this small quantity may be disregarded.

Cooling of the emulsion after distillation is complete should not be carried further than that point at which the dispersed solid becomes sufficiently hard and non-tacky and coalescence is no longer possible, for instance, from about 60° C. down to about 30° C. Care should also be taken that the distillation rate is not sufficiently high to cause excessive foaming. Most of the particles are spheroidal.

FINISHED COMPOSITION

The nature of the finished composition may, of course, be varied. The total solids may range from about 20% to about 60% by weight of the total composition, the limits depending on the particular resin or resins employed. The preferred range is from about 30% to about 50%, the limits again depending on the particular resin or resins employed. For example, for a composition containing polyvinyl formal resin, the desirable range of solids is between about 35% and about 45%. The concentration will be similar for other polyvinyl acetal resins, for instance, polyvinyl acetaldehyde acetal, polyvinyl butyral, polyvinyl propional and polyvinyl benzal.

The viscosity of the compositions may range from about 100 centipoises to about 6000 centipoises depending on the use to which they are to be put, with a viscosity from about 200 to about 2000 preferred. The residual solvent can be reduced substantially to a minimum, i. e. in the range between about 1% and about 4%, and is usually less than about 3%. The emulsion is also characterized by substantial absence of salts, acids, reagents, excess emulsifiers and all undesirable impurities.

Generally speaking, the total amount of the several preferred emulsifying agents present in the finished composition will range from about 1.5% to about 4% by weight, with the range from about 2.0% to about 3.5% preferred. These amounts will, of course, vary with the viscosity of the resins being put into emulsion form and with the proportion of solids in the finished composition. When preparing an emulsion of a high viscosity resin such as polyvinyl formal of the order of about 95% hydrolysis made from a polyvinyl acetate of viscosity about 15 and using about 3% partially hydrolyzed polyvinyl acetate, about .5% tragacanth and about .25% methyl cellulose, the total amount of emulsifying agent present in the finished composition will range from about 3.5% for an emulsion containing about 20% solids down to about 2.6% in the case of an emulsion containing about 50% solids. When preparing an emulsion of a low viscosity resin, such as for instance, phenol formaldehyde or rosin and containing the respective amounts of emulsifier mentioned in connection with the high viscosity resin, the total amount of emulsifying agent in the finished composition will range from about 3.1% to about 2% by weight of the total composition. The amount of surface-active agent will range from about .03% to about .6% by weight of the total composition. The finished compositions are stable for practical purposes indefinitely at the usual temperatures encountered during storage and under normal conditions of handling.

The composition may be modified by the inclusion of various materials. For example, solvents may be added to give uniform, continuous smooth films under various conditions of application. These solvent modifiers are those which are capable of being emulsified or dissolved in the emulsion at room temperature without exerting a precipitating action on the emulsion. Plasticizers are also desirable under certain conditions. Fillers, pigments and other such materials may be added for the formation of compositions which can be used as paints and the like. There may also be added agents of a non-coalescing nature, which modify the properties of the film such as heat-hardening agents of a resinous nature or reactive materials such as aldehydes or polymerizable materials.

USE

Emulsions formed as described above are particularly useful for coating, impregnation and similar purposes. For many applications they can be used in place of conventional solvent solutions of their particular resinous materials. When properly compounded and applied at suitable temperatures, they form clear, water and abrasive resistant coatings. The usual methods of application may be employed, such as for instance, brushing, spraying, roll coating and by doctor knife.

Of particular utility are the polyvinyl acetal emulsions made according to the present invention. Since the properties of polyvinyl formal are particularly desirable, the discussion of an emulsion containing this resin will be of assistance in appreciating the advantages offered by the present teachings. For example, an excellent coating can be formed from a polyvinyl formal emulsion containing from about 15% to about 25% of a filming agent such as for instance, diacetin and from about 2% to about 10% of a complementary filming agent, such as for instance, acetonyl acetone. When this composition is filmed onto a clean surface of wood, composition or metal and subjected to about 150° C. for about 2 to about 10 minutes, the film is clear, water-resistant tough and flexible. In cases where the film must be free from solvent and need not be pliable, as in certain metal coatings, such a filming agent mixture as toluene-alcohol, trichlorethylene alcohol, etc., may be added in quantities of up to about 30% on the total charge. Such compositions can be laid down as continuous films by baking at temperatures from about 110° C. to about 150° C. for a time from about 2 to about 30 minutes.

Furthermore, these compositions may, by observing certain drying conditions, be employed to impregnate laminated wood products under pressure. Pressures of about 2000 pounds per square inch or greater at temperatures of about 150° C. may be employed to achieve impregnation to depths exceeding 30 mils. For example, a totally impregnated wood composition of surprising strength and hardness and having a density of from about 1.1 to about 1.4 (water equals 1) can be formed as follows. A polyvinyl formal emulsion containing about 40% solids and about 5% toluene-alcohol solvent is first filmed on to birch veneers so that the total weight of dried resin per face is equivalent to about 7½% by weight of the total weight of the wood and film. These veneers are then dried at about 60° C. for about 10 minutes and then subjected to a pressure of from about 300 pounds per square inch to about 3000 pounds per square inch. The products resulting from the use of the higher pressure are totally impregnated wood compositions of surprising strength and hardness and those resulting from the use of the lower pressures are powerfully bonded veneer products. These laminated products can be used for many purposes, for instance, in the manufacture of aircraft, aircraft propellers, boats and etc.

Compositions made according to the invention and including other resinous materials have similar utility commensurate with the nature of the particular resinous body employed. It will also be understood that various other modifications may be made in the specific expedients described. The latter are illustrative only and not offered in a restricting sense, it being desired that only such limitations shall be placed thereon as may be required by the state of the prior art.

The sub-titles used throughout the specification are merely to simplify reference thereto and should otherwise be disregarded.

I claim:

1. A process of preparing a stable aqueous emulsion of a water-stable and water-insoluble film forming agent selected from the group consisting of high polymeric condensation resins, natural resins, and cellulose derivatives, comprising, preparing an aqueous solution containing as emulsifying agents 0.8% to 5% of polyvinyl acetate partially hydrolyzed to contain 10% to 35% residual polyvinyl acetate groups by weight, 0.2% to 0.8% of a water-soluble gum, and 0.03% to 0.6% of an anionic surface-active agent, preparing a volatile water-immiscible organic solvent solution of the resin of viscosity from .5 poise to 100 poises, introducing a part of the solvent solution into the aqueous solution, bringing the resulting charge to distillation temperature, distilling the solvent off rapidly and introducing an additional amount of the solution, the rate of addition of the solution being such as to maintain the volume of the charge substantially constant until all the solvent solution has been introduced into the charge, then distilling off substantially all the remaining solvent, and cooling the emulsion so formed, the amount of the resin solution added being such that the total solids in the resulting emulsion is within the range from about 20% to about 60% by weight of the emulsion.

2. A process of preparing a stable aqueous emulsion of a water-stable and water-insoluble polyvinyl formal resin comprising dispersing into a boiling aqueous solution containing a volatile water-immiscible organic solvent for the resin, a solution of said resin in the same volatile solvent while simultaneously distilling off said solvent at a rate such that the volume of the charge remains substantially constant until all the resin solution is added, and continuing said distillation until the dispersion contains less than 4% of said solvent, said aqueous solution containing as agents effective to stabilize the dispersion under the conditions of distillation and subsequent storage 0.8% to 5% of polyvinyl acetate partially hydrolyzed to contain 10% to 35% residual acetate groups, 0.2% to 0.8 of a water-soluble gum, and 0.03% to 0.6% of an anionic surface-active agent.

3. A process, according to claim 1, wherein the resin is a polyvinyl acetal and the distillation is carried out at a rapid rate.

4. A process, according to claim 1, wherein the resin is a polyvinyl acetal.

5. A process, according to claim 1, wherein the resin is a polyvinyl acetal and the temperature of the kettle during addition of the charge and distillation is maintained within the range from about 74° to about 78° C. and when the addition of the polyvinyl acetal solution is complete the temperature of the charge is slowly raised to about 90° C. and held there until distillation is substantially complete.

6. A process, according to claim 1, wherein the part of the solvent solution of the resin added to the aqueous solution before distillation is about 25% of the total solvent solution to be added.

HENRY MICHAEL COLLINS.

REFERENCES CITED

The following references are of record in the file of this patent:

UNITED STATES PATENTS

| Number | Name | Date |
| --- | --- | --- |
| 2,190,705 | Dreyling et al. | Feb. 20, 1940 |
| 2,216,233 | Dreyling et al. | Oct. 1, 1940 |
| 2,279,387 | Cheetham et al. | Apr. 14, 1942 |
| 2,296,427 | Daniel et al. | Sept. 22, 1942 |
| 2,343,092 | Smith | Feb. 29, 1944 |
| 2,396,607 | Rogers | Mar. 12, 1946 |

FOREIGN PATENTS

| Number | Country | Date |
| --- | --- | --- |
| 475,162 | Great Britain | Nov. 12, 1937 |